United States Defensive Publication [19] (H) [11] T104,305

Sattelmaier [43] Jun. 5, 1984

[54] METHOD OF MAKING FULL COLOR DRY TRANSFERS

[76] Inventor: John Sattelmaier, 2824 Skipton Rd., Richmond, Va. 23225

[21] Appl. No.: 524,222

[22] Filed: Aug. 18, 1983

Related U.S. Application Data

[63] Continuation of Ser. No. 272,974, Jun. 12, 1981.

[51] Int. Cl.³ ..... B41F 15/04; B41M 5/26

[52] U.S. Cl. ..... 101/115; 8/471; 101/470

[57] ABSTRACT

Full color dry transfers are prepared economically and in a semiautomated manner using a mimeograph duplicator in which a full color original is used to prepare one each of yellow, magenta and cyan stencils in an electronic facsimile scanning device, then each stencil together with the correspondingly colored mimeograph ink is used in a mimeograph duplicator to produce in seriatum a full color dry transfer according to the disclosed process.

7 Claims, 1 Sheet Drawing,

16 Pages Specification

The file of this unexamined application may be inspected and copies thereof may be purchased (849 O.G. 1221, Apr. 9, 1968).

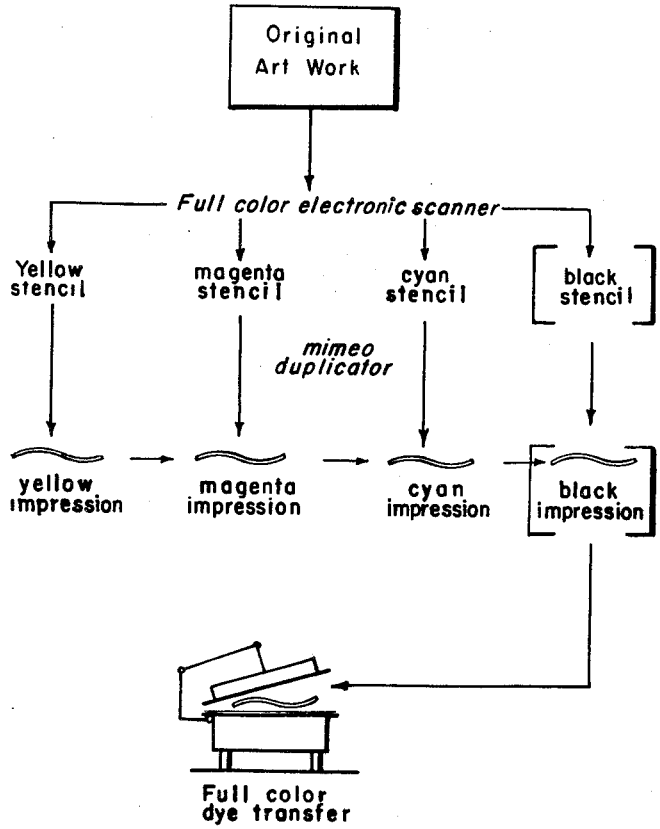

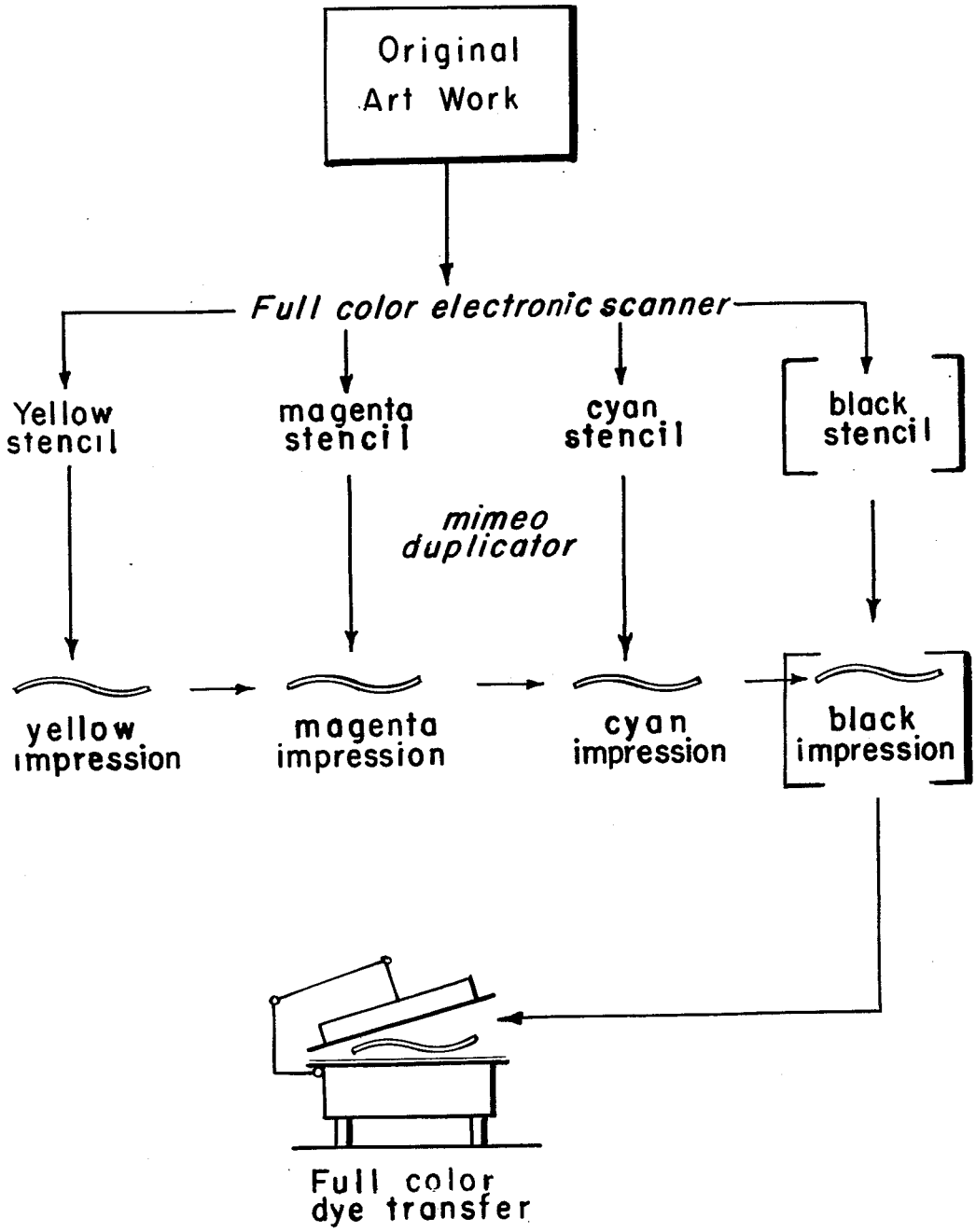
Original
Art Work
Full color electronic scanner
Yellow
stencil
magenta
stencil
cyan
stencil
black
stencil
mimeo
duplicator
yellow
impression
magenta
impression
cyan
impression
black
impression
Full color
dye transfer